United States Patent [19]
Sabelström et al.

[11] Patent Number: 5,906,480
[45] Date of Patent: May 25, 1999

[54] DEVICE FOR CHARGING A TRUCK PNEUMATIC SYSTEM

[75] Inventors: Mats Sabelström, Billdal; Ulrich Gobert, Hisings Kärra, both of Sweden

[73] Assignee: AB Volvo, Gothenburg, Sweden

[21] Appl. No.: 08/693,045

[22] PCT Filed: Feb. 17, 1995

[86] PCT No.: PCT/SE95/00168

§ 371 Date: Sep. 12, 1996

§ 102(e) Date: Sep. 12, 1996

[87] PCT Pub. No.: WO95/22474

PCT Pub. Date: Aug. 24, 1995

[30] Foreign Application Priority Data

Feb. 18, 1994 [SE] Sweden .................................. 9400575

[51] Int. Cl.⁶ .............................. F02B 37/04; F04B 17/05
[52] U.S. Cl. ............................................. 417/364; 60/609
[58] Field of Search .................................. 60/605.1, 609;
123/559.1; 417/364, 380

[56] References Cited

U.S. PATENT DOCUMENTS

| 2,350,896 | 6/1944 | Jde | 123/559.1 |
| 2,489,540 | 11/1949 | Priess | 417/364 |
| 3,204,859 | 9/1965 | Crooks | 417/364 |

FOREIGN PATENT DOCUMENTS

| 3 011 360 | 10/1981 | Germany . |
| 458546 | 4/1989 | Sweden . |
| 467269 | 6/1992 | Sweden . |
| WO 93/23660 | 11/1993 | WIPO . |

*Primary Examiner*—Michael Koczo
*Attorney, Agent, or Firm*—Young & Thompson

[57] ABSTRACT

Device for charging a truck pneumatic system. The truck has a mechanical compressor (8) for supercharging combustion air to its internal combustion engine (1). The compressor is actuated in the lower half of the engine rpm range. Charging occurs when operating conditions so permit, with air from the charge air system, preferably from the pressure side of the mechanical compressor (8).

8 Claims, 1 Drawing Sheet

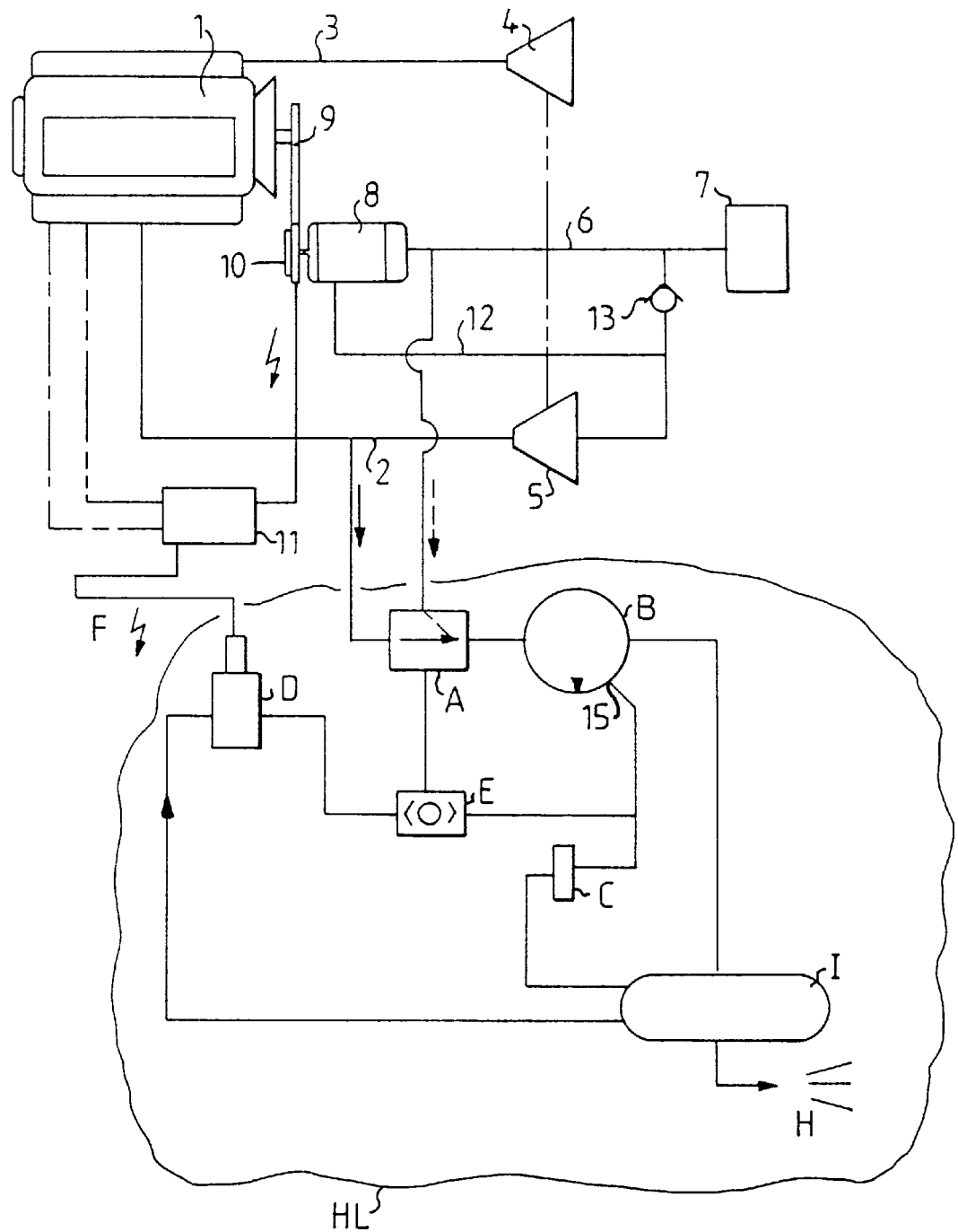

DEVICE FOR CHARGING A TRUCK PNEUMATIC SYSTEM

The present invention relates to a device in a motor vehicle with an internal combustion engine supercharged by a compressor and with a compressed air system comprising an air-compressor.

Todays trucks are often provided with different types of auxiliary systems to assist the driver and to make his work-place more comfortable. One of these auxiliary systems consists of an air-compressor which is designed to provide the truck pneumatic brake system, for example, with sufficient compressed air. Technical developments have brought forth more and more possibilities for utilizing compressed air for various purposes, which were not originally intended, such as air spring systems or suspension-level control both for transport/driving and unloading and loading purposes, both for the tractor and trailer. Increasing insight into the utility and use of compressed air has accompanied the increase in the capacity or available volume per unit of time for compressed air systems. To a certain extent, the problem which this has posed has been solvable by using more or larger tanks, which are mounted on the truck frame. Such tanks, however, take up a large amount of space and increase the weight of the vehicle, not to mention being costly. Increasing demands on the transport economy, load capacity and equipment packing, at the same time as there has been an increased need for compressed air, it has not been possible to increase pump capacity for reasons of both cost and space, particularly since high capacity is generally required at low engine rpm and with the truck standing still. The volume of compressed air which is possible to store in the tanks is seldom sufficient.

It is previously known to draw off combustion air from turbo-compressors to precharge compressed-air compressors. In such systems it has, however, proved difficult to achieve sufficient precharging pressure from the turbocompressor at low rpm, and thus there will be only a marginal contribution from precharging. All of these known systems thus function best at high engine rpm and high load.

The purpose of the present invention is to achieve a device of the type described by way of introduction which provides more effective precharging of the air-compressor at low engine rpm than what has been achieved in systems known up to now.

This is achieved according to the invention by virtue of the fact that the compressor for supercharging the engine is mechanically driven and its pressure side is connectable via valve means to the suction side of the compressor for compressed air.

A great advantage of the invention is that in vehicles with air springs and in which it is possible to regulate the chassis to adapt it to different heights of loading docks, for example, it is possible for the driver, without delay, to raise the chassis/suspension of the unit immediately after starting the engine at low engine rpm and load.

Another advantage of the invention is that the installation can be completed when the engine is manufactured. This is possible by virtue of the fact that only one extra line needs to be drawn for system compressor air. One less airfilter is required since the system compressor air can always be drawn via a "clean" air line with the device according to the invention.

An additional advantage of the invention is that otherwise normally occurring unintentional introduction of oil into the pneumatic compressor can be minimized with a device according[] to the invention, because the pneumatic compressor can be continuously held under overpressure.

The invention with control equipment will be described in more detail below with reference to the accompanying FIGURE, which shows a preferred embodiment of the device according to the invention, applied to an engine with both a mechanical supercharger and a turbocharger.

In the FIG., 1 designates a four-stroke internal combustion engine of diesel type, 2 designates the intake line to the engine and 3 the exhaust line. A turbosystem comprising a turbine 4 and a turbocompressor 5 is connected in a conventional manner to the intake line 2 and the exhaust line 3. The intake line 2 is branched from a line 6 between an air-filter 7 and the suction side of a mechanical compressor 8 driven by the engine 1. The mechanical compressor 8 can be of any known type, but preferably of displacement type, for example a screw compressor, and is driven directly by the engine crankshaft via a V-belt transmission generally designated 9. Furthermore, there is an electromagnet clutch 10 between the drive shaft of the compressor 8 and its pulley. An electronic control unit 11 turns the clutch on and off. The control unit is supplied with signals representing the operating states of the engine 1 (represented by the dashdot lines in FIG. 1). The pressure side of the mechanical compressor 8 is coupled via a line 12 to the intake line 2 upstream of the turbocompressor 4,5 but downstream of a mechanical check valve 13, which can be of any known type, e.g. a valve with a closure element in the form of a spring-loaded flap (see SE-9002849-9).

The described engine installation functions as follows:

The mechanical compressor 8 is engaged at low and intermediate rpm and it is turned on and off by the electronic control unit 11. If the engine is working under full load with the compressor 8 activated, all charge air is required for fuel combustion. In this operating state, no air should be drawn off to the pneumatic compressor. Therefore, the engine electronics see to it that a signal is sent to the control electronic unit 11, which sees to it, via an input F to a solenoid valve D, that air, instead of being drawn off from the pressure side of the turbocharger system, is taken from the line 6 between the air filter 7 and the suction side of the mechanical compressor 8, and therefore the pneumatic compressor, here designated B, must do all of the work itself. The same thing occurs, if at a cautious start, there is a sudden increase in load, whereupon the engine electronics immediately sees to it that the air to the pneumatic system is obtained in the form of air at atmospheric pressure in an analogous manner. This function will be described in more detail below. At increasing load (increasing engine rpm), the air requirements of the turbocompressor will gradually increase. Since the requirement exceeds the volume which the mechanical compressor is capable of delivering, the check valve 13 will automatically open since the pressure downstream of the check valve will be less than the pressure on the a airfilter side. After the check valve is opened, the mechanical compressor 8 has no function, and in order to reduce the engine fuel consumption and noise, as well as reducing wear on the compressor 8, the mechanical compressor is disengaged at this stage by the control unit 11, disengaging the clutch 10.

As was already pointed out above, it is preferred that the design be used in a truck which has an engine which is super-charged both by means of a mechanical compressor 8 and by means of an exhaust turbocompressor system 4,5. The more detailed design of the charging of the pneumatic system, using the mechanical engine compressor under various circumstances will now be described.

The pneumatic system can obtain its air from two different points in the engine combustion system, either from the line 2, where there is usually an airpressure above atmospheric pressure, or from the line 6 on the suction side of the mechanical engine compressor, where there is always atmospheric pressure. Air is drawn from one of these two lines, via an air-controlled alternative valve A. Which of its two positions the alternative valve assumes is determined by the operating states of the vehicle, in practice speed and/or engine rpm and/or gear selection, as well as load. The pneumatic compressor, regardless of where it has obtained its air, pumps the compressed air into a tank I and then to the points of consumption H. The compressor is relieved when the pressure in the vehicle pneumatic system has reached a specified pressure, and the compressor will then no longer be able to pump a higher pressure than about 5 bar, which is lower than the lower pressure in the vehicle pneumatic system. When the compressor B is relieved, it is therefore important that it be supplied with air at atmospheric pressure, i.e. from the line 6. If the compressor should erroneously be supplied with air from line 2, i.e. compressed air instead, the compressor would pump out a pressure higher than the system pressure, which is very unadvisable. When, as in this preferred case here, a relieved compressor is used, there is a distributor valve E which, under the influence of a regulator C, which senses the pressure in the system in the vehicle, opens at a predetermined pressure, the so-called de-control pressure, thus pressurizing the port 15 of the compressor, thus relieving the compressor and switching over the distributor valve E so that the alternative valve A takes air from the line 6.

For the alternative that the compressor is of such a design that it is capable at relief of being supplied with compressed air instead of air at atmospheric pressure, the distributor valve E can be eliminated.

In addition to the arrangements described above, there is an additional circuit, which comprises a solenoid valve D, which is supplied with air from the tank I. The solenoid valve opens as a result of a voltage established via F (control voltage), said signal coming from the motor electronics and seeing to it that air is, sent to the alternative valve A via the distributor valve E and seeing to it that the air to the pneumatic compressor B is drawn from the line 6. One of the criteria for such a signal being sent is that the vehicle speed exceeds a certain speed, e.g. 7 km/h, when it is assumed that the air of the mechanical compressor is required to provide the vehicle engine with combustion air. For this purpose, there is a speed sensor in the vehicle, suitably integrated in the speedometer function. Under extraordinary, conditions, for example when the vehicle is to start at full load on a hill, the signal via F can be given at a lower speed, i.e. the motor electronics are soon to be coupled to the control unit 11 in such a way that this case is covered.

The invention is not considered to be limited to the above described embodiment but is to be considered to comprise all designs which can be encompassed by the accompanying claims.

We claim:

1. Device in a motor vehicle with a four-stroke internal combustion engine supercharged by a mechanical compressor and with a compressed air system comprising a pneumatic compressor, wherein the mechanical compressor is driven by a crankshaft of the engine and has a pressure side connectable via valve means to a suction side of the pneumatic compressor, and wherein said valve means comprise a controlled alternative valve that selectably connects the suction side of said pneumatic compressor to one of the pressure side of the mechanical compressor and a suction side of the mechanical compressor.

2. Device according to claim 1, wherein the alternative valve is controlled by a pressure regulator as a function of air pressure in a pressure tank.

3. An air compressing system for a motor vehicle with an internal combustion engine having a turbo system with a turbine driven by the engine exhaust and a turbo compressor driven by the turbine for providing compressed air to the engine intake, the air compressing system comprising:

a precharging system comprising a mechanical compressor for precharging the air compressing system, said mechanical compressor comprising a suction side connected to an air intake and a pressure side connected to an intake of the turbo compressor, said precharging system further comprising a check valve connecting said suction side to the intake of the turbo compressor;

a pneumatic compressor for providing compressed air for the air compressing system; and an alternative valve connected to said pneumatic compressor, said suction side and said pressure side for selectively connecting one of said suction side and said pressure side to said pneumatic compressor.

4. The system of claim 3, further comprising an electronic controller for controlling said alternative valve based on inputs from the engine.

5. The system of claim 3, further comprising a distributor valve for controlling said alternative valve based on inputs from a storage tank for the air compressor system.

6. The system of claim 3, wherein said alternative valve is connected to said pressure side of said mechanical compressor at a pressurized outlet of the turbo compressor.

7. The system of claim 3, wherein said mechanical compressor comprises a clutch for selectively driving said mechanical compressor with the engine crankshaft.

8. The system of claim 7, further comprising an electronic controller for controlling said alternative valve based on inputs from the engine and for controlling said clutch.

* * * * *